(12) United States Patent
Gross

(10) Patent No.: US 10,988,260 B2
(45) Date of Patent: Apr. 27, 2021

(54) SEAT GROUP ARRANGEMENT FOR A PASSENGER CABIN OF AN AIRCRAFT

(71) Applicant: AIRBUS OPERATIONS GMBH, Hamburg (DE)

(72) Inventor: Claus-Peter Gross, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 16/542,445

(22) Filed: Aug. 16, 2019

(65) Prior Publication Data
US 2020/0055605 A1   Feb. 20, 2020

(30) Foreign Application Priority Data

Aug. 17, 2018 (DE) .................... 10 2018 006 514.7

(51) Int. Cl.
*B64D 11/06* (2006.01)
(52) U.S. Cl.
CPC ...... *B64D 11/0693* (2013.01); *B64D 11/0696* (2013.01)
(58) Field of Classification Search
CPC .................. B64D 11/0693; B64D 11/0696
See application file for complete search history.

(56) References Cited

U.S. PATENT DOCUMENTS

| | | | |
|---|---|---|---|
| 5,104,065 A * | 4/1992 | Daharsh | B64D 11/0693 244/118.6 |
| 5,178,345 A * | 1/1993 | Peltola | B64D 11/0693 244/118.6 |
| 5,553,813 A * | 9/1996 | Merensky | B60N 2/062 244/118.6 |
| 5,584,532 A * | 12/1996 | Marechal | B60N 2/062 297/257 |
| 5,727,845 A * | 3/1998 | Jackson-Wynch | B64D 11/0693 244/118.6 |
| 5,829,836 A | 11/1998 | Schumacher et al. | |
| 5,957,407 A * | 9/1999 | Auestad | B64D 11/0693 244/118.6 |
| 6,076,768 A * | 6/2000 | Durand | B60N 2/062 244/118.6 |

(Continued)

FOREIGN PATENT DOCUMENTS

| | | |
|---|---|---|
| DE | 195 34 024 A1 | 3/1997 |
| WO | WO 2014/011320 A1 | 1/2014 |

*Primary Examiner* — Philip F Gabler
(74) *Attorney, Agent, or Firm* — Jenkins, Wilson, Taylor & Hunt, P.A.

(57) ABSTRACT

For a seat group arrangement for a passenger cabin of an aircraft it is proposed to realize a temporary enlargement of the circulation area by widening the longitudinal aisle of the aircraft for the entry and exit period. For this purpose, a passenger seat group has a supporting frame which is provided with seat legs for fastening to the aircraft floor. At least one first fixedly secured seat having in each case a seat part and in each case a backrest and a further seat which is movable in the transverse direction and has a seat part and a backrest is provided on the supporting frame. The further seat is connected to the supporting frame via a folding device, and the folding device is configured to realize a change in width of the further seat in relation to the seat legs of the supporting frame.

20 Claims, 6 Drawing Sheets

(56) References Cited

U.S. PATENT DOCUMENTS

| | | | | |
|---|---|---|---|---|
| 7,578,551 B2* | 8/2009 | Linero | ................... | A47C 1/122 |
| | | | | 297/107 |
| 8,708,410 B2* | 4/2014 | Scott | ................. | B64D 11/0696 |
| | | | | 297/236 |
| 9,359,079 B2* | 6/2016 | Scott | ................. | B64D 11/0693 |
| RE47,872 E * | 2/2020 | Scott | ................. | B64D 11/0693 |
| 2016/0318611 A1* | 11/2016 | Brownjohn | ........ | B64D 11/0693 |
| 2018/0105272 A1* | 4/2018 | Scott | ................. | B64D 11/0646 |

* cited by examiner

SEAT GROUP ARRANGEMENT FOR A PASSENGER CABIN OF AN AIRCRAFT

CROSS-REFERENCE TO RELATED APPLICATION

This application claims priority to German patent application DE 10 2018 006 514.7, filed Aug. 17, 2018, the entire disclosure of which is incorporated by reference herein.

TECHNICAL FIELD

The disclosure herein relates to a seat group arrangement for a passenger cabin of an aircraft, to a passenger seat group and to a passenger cabin for an aircraft.

BACKGROUND

The disclosure herein relates to a passenger seat group and to a seat group arrangement, in particular in a passenger cabin of an aircraft, with a supporting frame which supports a plurality of seats. The seats are in each case provided with a seat part and a backrest. The supporting frame is provided with seat legs for fastening to a floor of the passenger cabin.

Conventional passenger seats for an aircraft have a supporting frame with at least one seat surface arranged fixedly thereon and with at least one backrest arranged in the region of the rear edge of the seat surface. Passenger seats of this type are conventionally grouped in seat groups in the form of a double seat group or triple seat group and form a seat layout which can be adapted in accordance with customer requirements. The passenger seats preferably form seat rows in the aircraft, wherein two or more passenger seats arranged next to one another can be combined to form a seat group which is supported by a common supporting frame. Armrests are arranged on both sides of the respective seat part. The seat groups are provided as rigid units for installing in the passenger cabins of the aircraft. Different configurations can occur here in accordance with airline requirements, wherein primarily as great a seat capacity as possible is sought, such as in particular for economy class.

In passenger cabins with a high number of seats, a longitudinal aisle of the cabin—also called circulation area—is conventionally provided between the seat rows in order to enable the passengers to enter and exit. A high outlay in terms of time for entry into an aircraft, what is referred to as boarding, is required when the passengers remain standing in the aisle to stow the hand luggage, as a result of which the aisle is blocked. The longitudinal aisle of the cabin is conventionally not wide enough for two airline passengers to move past each other. A further challenge arises even for passenger servicing and when carrying out cleaning work because of the narrow aisles.

This ground time between flights—also called turnaround time—is of crucial importance for the economic efficiency of a commercial aircraft. The circulation area therefore has to be configured such that, despite a high seat occupation in the passenger cabin, the passengers can rapidly enter and exit and the outlay on time for necessary ground work is minimized.

This can be achieved, for example, by a temporary enlargement of the circulation area, i.e. by widening the longitudinal aisle of the aircraft for the entry and exit period and for the ground time. Document DE 195 34 024 A1 discloses a passenger seat group which can be adjusted in width by transverse displacement of seats on a common rail of the supporting frame. By a leaf spring below the outer seat which is directed at least towards the longitudinal aisle of the aircraft, the seat width of the seat can be varied and thus, when the seat is not in use, can shrink because of the spring action of the leaf spring. When the seat is in use, because of the weight force of a passenger sitting on the seat, the spring element is tensioned and therefore the seat cushion is configured in the width intended for passenger use.

WO2014/011320 A1 discloses a seat system with a transversely displaceable seat which can be moved for the entry and exit of the passengers. The width of the longitudinal aisle of the aircraft can therefore also be enlarged here even if no passenger has taken a place in the seat group. In this solution, it is provided that the seat which is directed toward the longitudinal aisle of the aircraft can be displaced over the central seat by transverse displacement. For this purpose, the central seat is arranged lower and offset rearward within the seat group. In the disclosed arrangement, use of the central seat is not possible during the widening of the longitudinal aisle of the aircraft.

SUMMARY

It is an object of the disclosure herein to propose a seat group which provides a sufficient circulation area in the aircraft cabin for the ground time and therefore the entry and exit of the passengers can be configured more efficiently. With the shortening of the required ground time of the aircraft, the economic efficiency thereof can be considerably improved.

According to a first aspect, the object is achieved by a seat group as disclosed herein.

A seat group arrangement for a passenger cabin of an aircraft is disclosed, with at least one passenger seat group according to the disclosure herein. The passenger seat group has a supporting frame which is provided with seat legs for fastening to the aircraft floor. At least one first fixedly secured seat having in each case a seat part and in each case a backrest is provided on the supporting frame. A further seat which is movable in the transverse direction, i.e. is variable in width, having a seat part and a backrest is likewise provided on the supporting frame. The further seat part is connected to the supporting frame via a folding device, and the folding device is configured to realize a change in width of the further seat in relation to the seat legs of the supporting frame.

The effect which can therefore be achieved is that, by temporarily enlarging the circulation area, i.e. by widening the longitudinal aisle of the aircraft for the entry and exit period, more space is available to the passengers and therefore also a passenger can move past a passenger standing in the longitudinal aisle of the aircraft.

In a preferred refinement, the folding device in a first position of the seat part of the further seat takes up a position above the plane of the seat part of the at least first seat.

In a further refinement, the upper part of the supporting frame is provided with at least one supporting strut, wherein the supporting strut can be adapted in length by a telescopic rod in the region of the further seat in a manner corresponding to the change in width (folding movement).

The folding device preferably has at least one spring element which holds the further seat part in the unloaded state in the first position above the plane of the seat part of the first seat and, in the loaded state, the further seat part is positioned on the same plane as the seat part of the first seat. The spring element can be designed as a spiral spring.

Gas-filled compression springs or gas-filled compression dampers permitting the adjustment of spring properties are likewise possible.

Furthermore, the folding device has a lever system which, in operative connection with a sliding element, in the first position realizes the raising of the seat part with respect to the plane of the first fixedly secured seat part and simultaneously realizes a lateral offset of the seat part in relation to the second position (normal position).

In the operative connection of the lever system with the sliding element, in the normal position the further seat part is positioned in the same plane with respect to the plane of the first fixedly secured seat part and simultaneously, by lateral lowering of the further seat part, the normal seat width of the further seat is reached.

A further aspect is that an outer armrest support which faces the longitudinal aisle of the aircraft and has an armrest element is connected to the at least one telescopic rod via at least one rod receptacle.

Furthermore, the backrest of the further seat can be designed to be displaceable via displacement spindles for changing the width of the further seat.

Furthermore, a passenger seat group is disclosed, having a supporting frame which is provided with seat legs for fastening to a floor, at least one first fixedly secured seat having in each case a seat part and in each case a backrest and also a further seat which is movable in the transverse direction and has a seat part and backrest is provided on the supporting frame. According to the disclosure herein, the further seat is connected to the supporting frame via a folding device, and the folding device is configured to realize a change in width of the further seat in relation to the seat legs of the supporting frame.

Furthermore, a passenger cabin of an aircraft is disclosed which is equipped at least in regions with a seat group according to the disclosure herein.

Advantageous refinements of the seat group and preferred embodiments of the passenger cabin of an aircraft are disclosed herein.

BRIEF DESCRIPTION OF THE DRAWINGS

Further features, advantages and possible uses of the disclosure herein will emerge from the following description of the example embodiments in the figures. In the figures (also used as "FIG" in the drawings), the same reference signs furthermore represent identical or similar objects. The individual components are illustrated schematically and therefore serve for explaining the basic and functional relationship of the disclosure herein.

DETAILED DESCRIPTION

Figure 1:
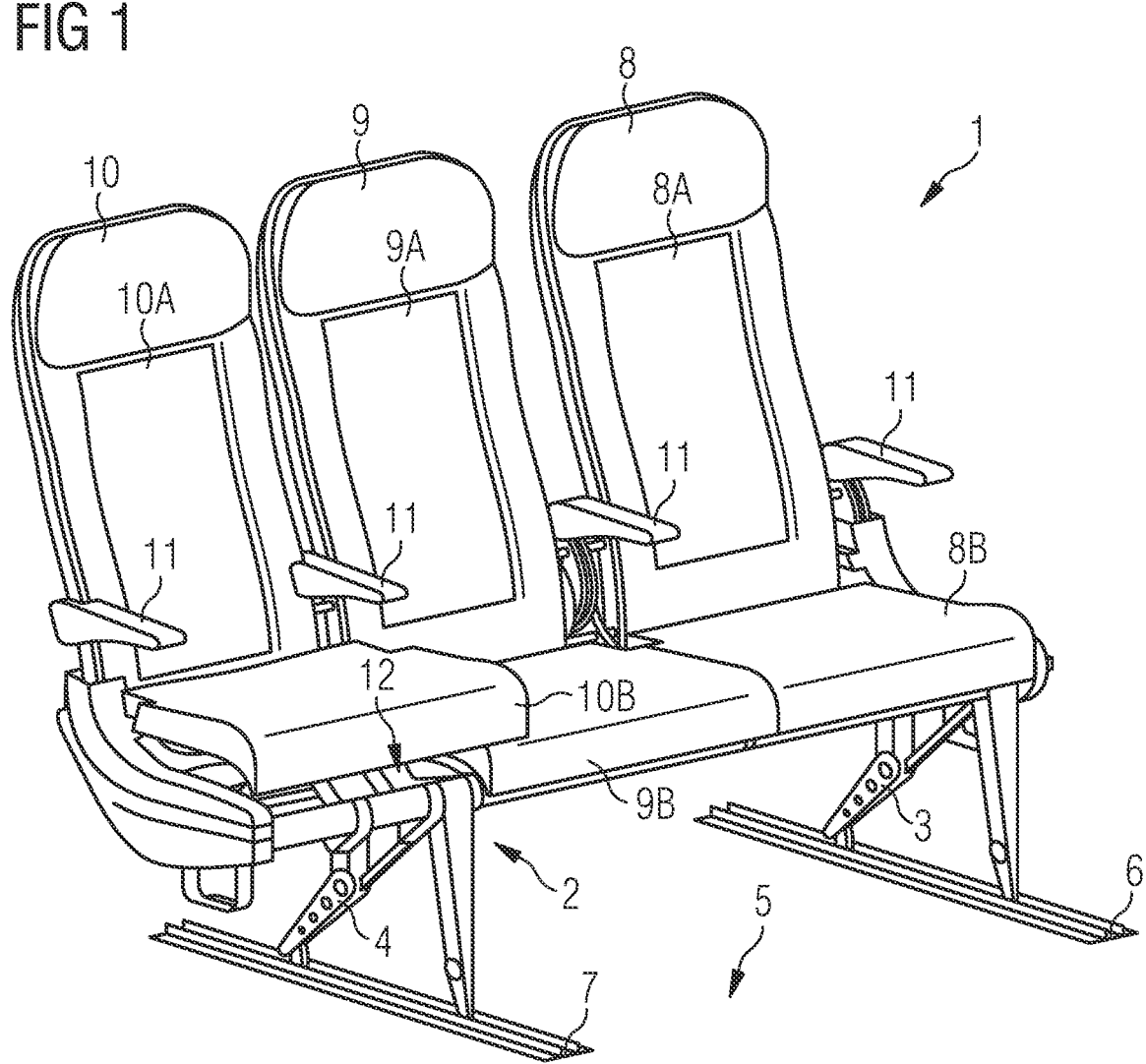
FIG. 1 shows a seat group for passengers in a schematic perspective view with an aisle seat lifted up.

FIG. 1 shows a schematic perspective view of a passenger seat group 1. The latter contains a supporting frame 2 which is provided with seat legs 3 and 4 for fastening to a floor 5. Passenger seat groups 1 of this type are conventionally used in passenger aircraft in economy class passenger zones. The passenger seat group 1 is fastened to the floor 5 via seat rails 6 and 7.

The passenger seat group 1 comprises a plurality of seats 8, 9 and 10 which are arranged next to one another and are attached to the common supporting frame 2. This seat group 1 which is shown is designed as a triple seat group. However, it is also possible to design double seat groups as a passenger seat group 1 according to the disclosure herein. The respective seat comprises or consists in each case of a seat part 8B, 9B or 10B and in each case a backrest 8A, 9A, 10A. Armrests 11 are assigned to each seat 8, 9 or 10. The seat legs 3 and 4, also called frame legs, are secured in the seat rails 6 and 7, wherein insertion into and locking in the respective seat rail profile 6 and 7 takes place via conventionally known seat fittings (not shown) which are provided on the seat legs 3 and 4. The supporting frame 2 with the seats 8, 9 and 10 fitted thereon can therefore be mounted very simply within the aircraft cabin 1. The seat leg 3 which is secured in the seat rail 6 is advantageously located in the vicinity of the cabin wall (window side) and the seat leg 4 which is secured in the seat rail 7 is located in the direction of the cabin center, but not below the outer seat 10. This has the advantage that the foot space in the aisle 42 (see FIG. 2) is restricted as little as possible.

At least one seat with a seat part and a backrest is provided on the supporting frame 2 and is mounted fixedly on the supporting frame 2. The embodiment shown of the passenger seat group 1 has two seats 8 and 9 (first and second seat), which are mounted fixedly, and a further seat 10, which is movable in the transverse direction. For this purpose, the further seat 10 has a folding device 12. The folding device 12 connects the seat part 10B to the supporting frame 2. The folding device 12 is configured to realize a change in width of the further seat 10 in relation to the fixedly secured seat legs 3 and 4 of the supporting frame 2. It is shown in FIG. 1 that the folding device 12 in a first position holds the seat part 10B of the further seat 10 above the plane of the seat parts 8B and 9B of the first and second seat 8 and 9, and also a lateral displacement of the seat 10 in the direction of the second seat 9 (central seat) is realized.

Figure 2:
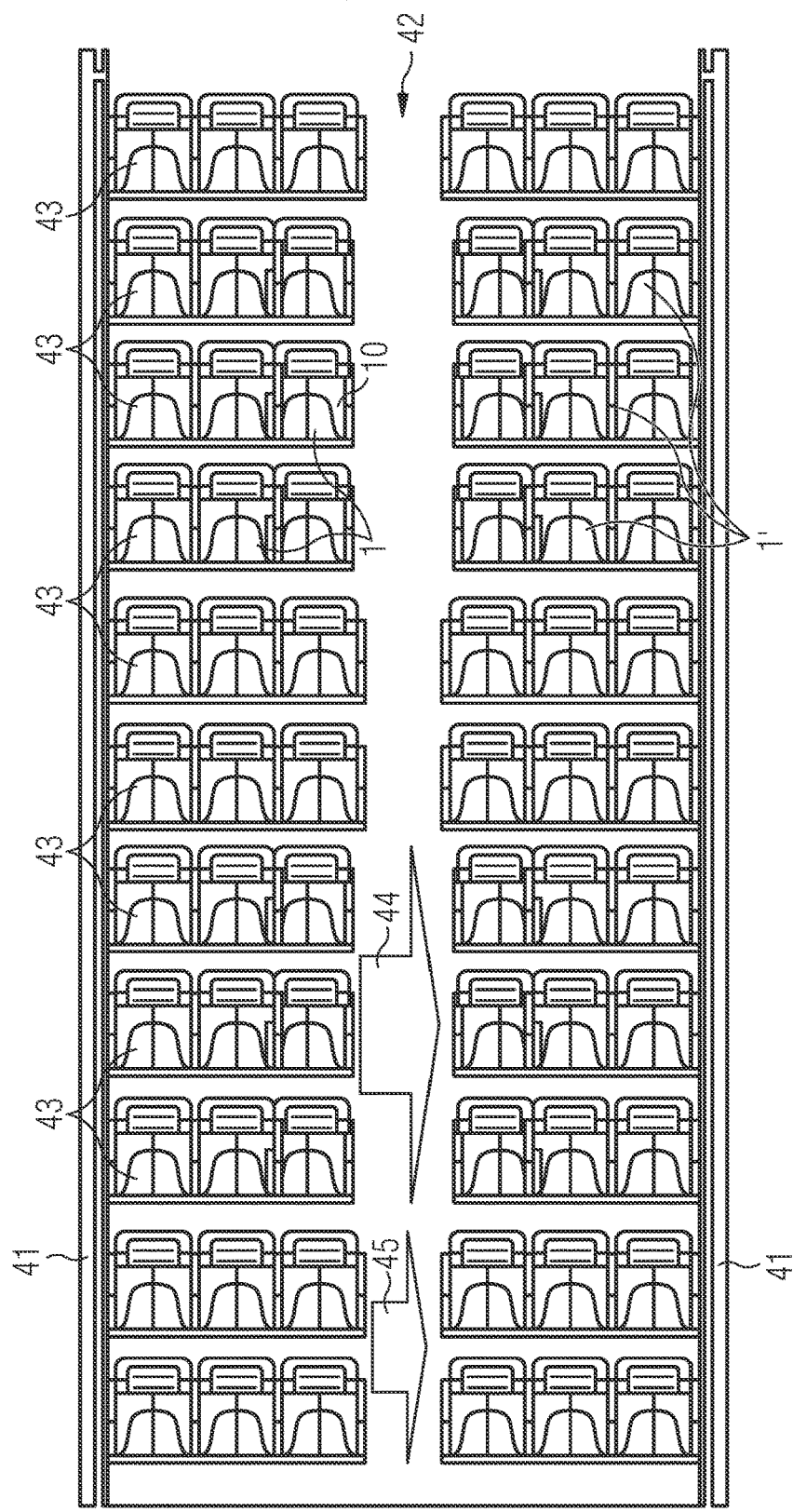
FIG. 2 shows a passenger cabin of an a commercial aircraft in a partial view of the cabin layout.

FIG. 2 shows a passenger cabin 40 of a commercial aircraft in a top view. Passenger seat groups 1 which are arranged in seat rows 43 can be seen in this view of part of a cabin layout. Economy class cabin zones are conventionally equipped in such a manner. A seat row 43 is formed with two passenger seat groups 1 and 1'. A multiplicity of seat rows 43 is conventionally provided. A longitudinal aisle 42 of the aircraft is preferably arranged centrally in the aircraft cabin 40, and the passengers, upon entry into the aircraft, can reach the corresponding seat row 43 via the longitudinal aisle 42 and can turn either to the passenger seat group 1 or to the passenger seat group 1. A problem in particular in the front or central region is that the longitudinal aisle 42 of the aircraft is not of a sufficient width in order to permit the passenger to move past a passenger who is standing in the aisle and conventionally has to stow the luggage in the luggage compartment. Passenger seat groups 1 and 1' according to the disclosure herein are provided in particular for the cabin region 44. The aisle seat 10 is reduced in its width here by the folding device 12, and therefore a noticeable enlargement of the circulation area is achieved for the entry and exit of the passengers. The cabin region 44 with the temporary widening of the aisle 42 can be seen. This can considerably improve the economic efficiency of the aircraft by shortening the necessary ground time of the aircraft. It is furthermore apparent that, in addition to the cabin region 44 with the possibility of enlarging the circulation area by temporary widening of the longitudinal aisle 42 of the aircraft, cabin regions 45 which do not realize a change in the width of the longitudinal aisle 42 of the aircraft can also be provided. It is therefore possible, for example, for "overtaking zones" to be set up which, despite passengers standing in the aisle 42, permit another passenger to move past. Alternatively, it is also possible to arrange a cabin region 45, for example, in the rear cabin region furthest away from the entry of the passengers and to provide the cabin region 44 in the region close to the entry.

Figure 3:
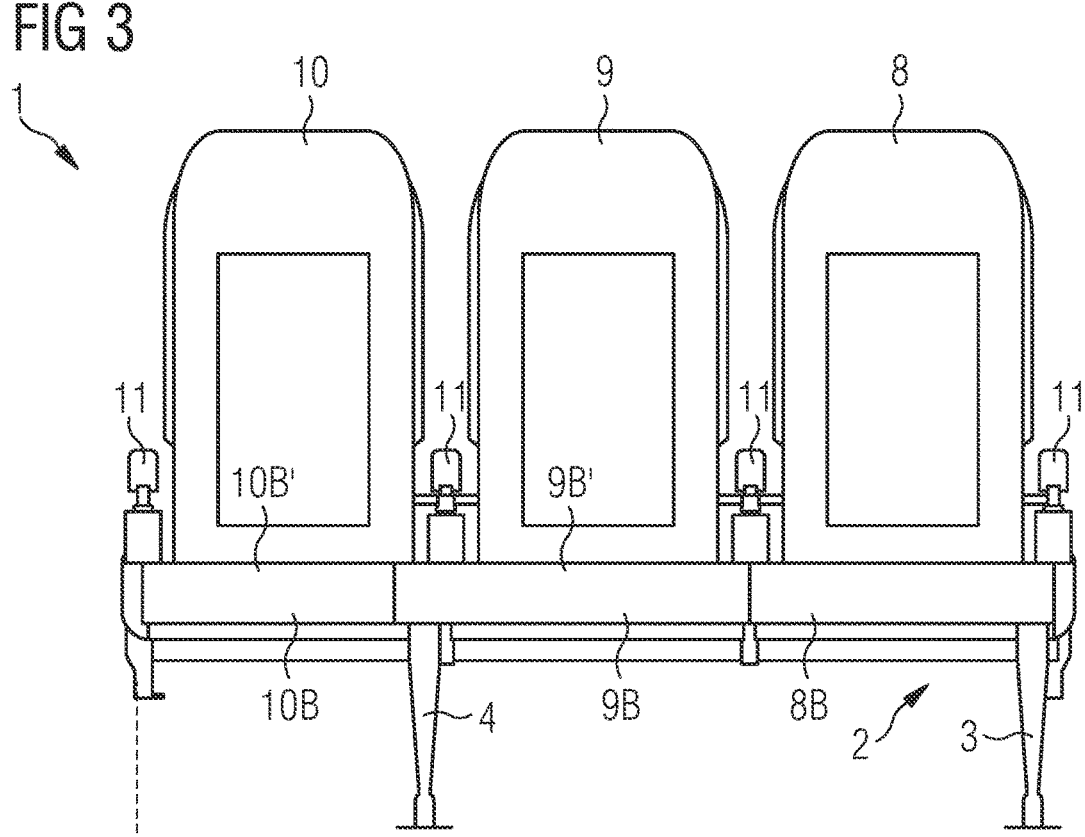
FIG. 3 shows the seat group for passengers in a view from the front.
Figure 4:
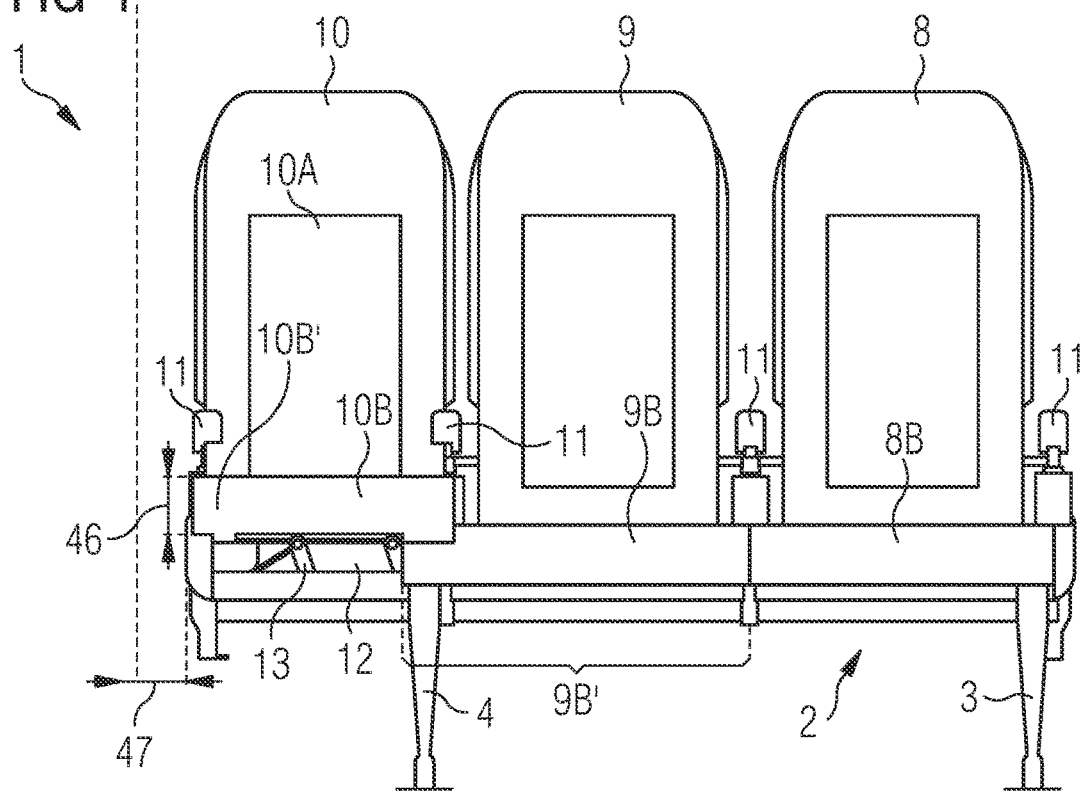
FIG. 4 shows the seat group with an aisle seat lifted up, in a view from the front.

FIGS. 3 and 4 show the seat group 1 according to the disclosure herein for passengers in a view from the front in the normal use position (in FIG. 3) and with a lifted-up aisle seat 10 (in FIG. 4) in the boarding position. It can be seen in FIG. 4 that the folding device 12 in the boarding position holds the seat part 10B of the aisle seat above the plane of the seat part 8B, 9B of the first and second seat 8 and 9. A lever system 13, is part of the folding device 12, in addition to the raising of the seat part 10B (see arrow 46), at the same time also realizes a lateral offset of the seat part 10B, which has the result of reducing the width of the entire seat group 1 (see arrow 47). In the preferred refinement, a vertical movement by approximately 3" (corresponds to 7.62 centimeters) and a horizontal/lateral movement of approximately 4" (corresponds to 10.16 centimeters) can be achieved. The longitudinal aisle 42 of the aircraft is therefore widened by this horizontal size in this boarding position. If the two passenger seat groups 1 and 1' of the passenger seat row 43 are equipped with the folding device 12 on the aisle seat, even a temporary widening by 8" would be possible. In the preferred embodiment which is shown, it can be seen that the seat part 9B of the central seat 9 is designed with a widened seat cushion 9B'. This widening corresponds to the 4" which the seat cushion 10B' of the seat part 10B is reduced by in order to fit between the armrests 11. It is therefore possible for the central seat 9 to be able to be used without restrictions even when the aisle seat 10 is lifted up. The seat cushion 10B' cannot pivot annoyingly into the seat region of the central seat 9. However, as an alternative embodiment, it is also possible for all of the seat cushions of the seat parts 8B, 9B, 10B to have the same width. Restrictions during the use of the central seat 9 are therefore possible when the aisle seat is lifted up. However, this may be accepted in certain use situations in line with a uniform seat configuration.

Figure 5:
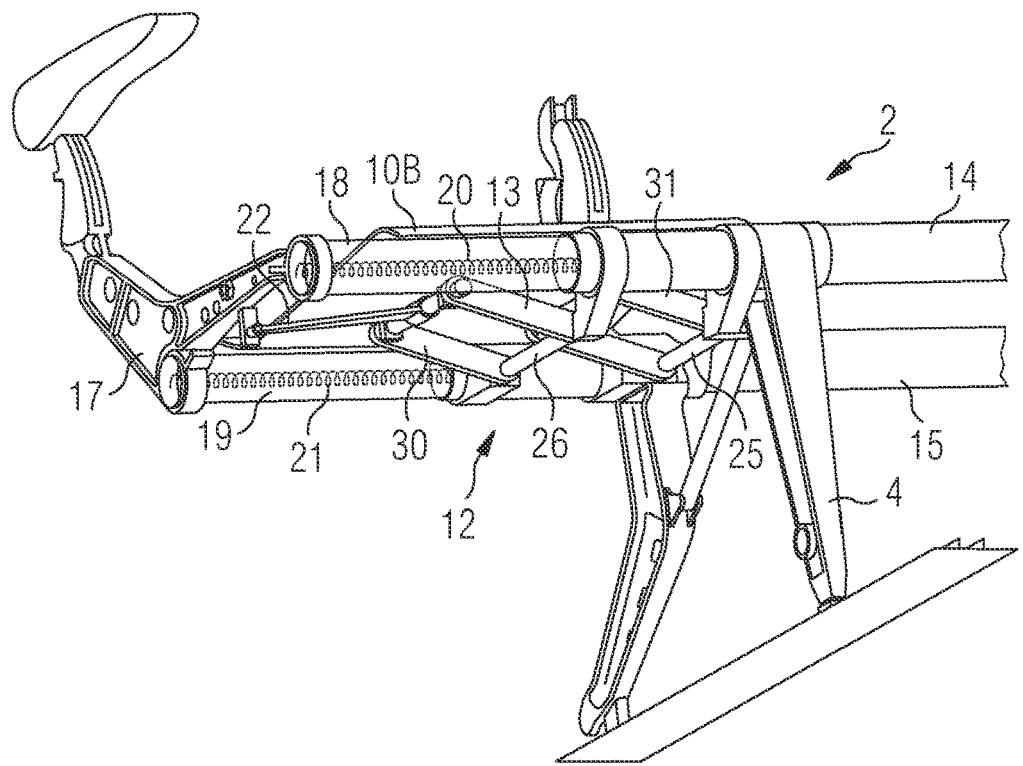
FIGS. 5 and 6 show the supporting frame with the aisle seat in the normal position and in a lifted-up position, in a schematic perspective view.
Figure 6:
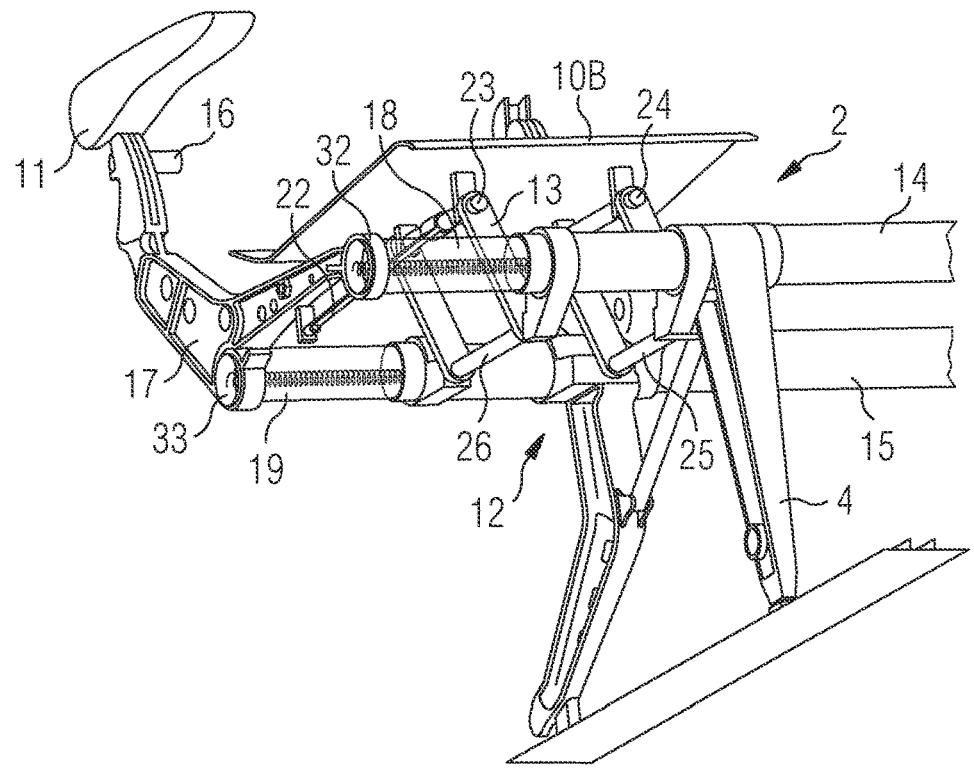

FIGS. 5 and 6 show the supporting frame 2 with the folding device 12 of the aisle seat 10 in a normal position and in a lifted-up position, in a schematic perspective view.

The supporting frame has two supporting struts 14 and 15, a front supporting strut 14 and a rear supporting strut 15. The supporting struts 14 and 15 are designed to be variable in width in the region of the seat 10. For this purpose, the aisle part of the supporting struts 14 and 15 is provided with telescopic rods 18 and 19, i.e. a front telescopic rod 18 and a rear telescopic rod 19. A folding device 12 raises the seat part 10B in the Z direction and simultaneously in the Y direction by spring force. The telescopic rods 18 and 19 are preferably designed at least in regions as tubes and spring elements 20 and 21 are arranged in the interior of the tubes. The spring elements 20 and 21 are preferably designed as spiral springs and are joined at a first end in the particular supporting strut 14 or 15 and at the second end to the outer end of the telescopic rod 18 or 19. An alternative which is not shown is the use of gas-filled compression springs as spring elements. The second end of the telescopic rod 18 or 19 is directed toward the aircraft aisle 42, i.e. outward from the seat part 10B. The outer armrest support 17 is likewise secured to the outer end of the telescopic rods 18 and 19.

FIG. 5 shows the supporting frame 2 when the seat 10 is occupied. The occupation of the seat 10 causes a weight force to act on the seat part 10B. The lever elements 30 and 31 fastened to the seat part 10B are rotated about the pivot spindles 23 and 24—coupled to the seat part 10*b*—and about the pivot spindles 25 and 26—coupled to the supporting struts 14 and 15—in a plane virtually parallel to a plane with respect to the longitudinal axis of the supporting struts 14 and 15. A sliding element 22 is coupled to the pivot spindle 23 and, during the pivoting movement of the lever elements 30 and 31, brings about the displacement of the telescopic rods 18 and 19 out of the supporting struts 14 and 15, and therefore the seat can take up a use/occupation position. The telescopic rods 18 and 19 are pushed out of the supporting struts 14 and 15 to such an extent that the seat part 10B can take up the regular width. The spring elements 20 and 21 are tensioned in this state. It can be provided that the occupation position is secured by latch-in or locking elements. For this purpose, for example, use can be made of mechanically acting latching elements. The seat 10B can therefore be used during the flight without restrictions.

In an alternative embodiment, the changing state between occupation position and boarding position takes place owing to the passenger's weight force acting on the seat part 10B or to the cessation of the weight force. It is likewise possible for the spring elements 20 and 21 to be designed as gas-filled compression springs or gas-filled compression dampers. Springs of this type permit the adjustment of spring properties and therefore the speed of lifting up of the seat part 10B can be influenced or the lifting up can take place with a time delay.

In order to permit a reduction in width of the passenger seat group 1, the two spring elements 20 and 21 have to be relaxed. This state of the seat 10B is shown in FIG. 6. Possibilities for triggering the lifting up of the seat part can be a release of a lock (not shown) so that the spring elements 20 and 21 move back into the original relaxed position or, alternatively, also by the cessation of the weight force, i.e. by the passenger standing up. With the relaxation of the spiral springs 20 and 21, the telescopic rods 18 and 19 are at least partially pushed into the supporting struts 14 and 15. At the same time, the sliding element 22 is therefore moved and, via the pivot spindle 23, pushes the lever system 13 with the lever elements 30 and 31 into the upper position. The lever system 13 operates in the manner of a parallelogram. By changing the height, the lever elements 30 and 31—mounted in upper pivot spindles 23, 24—are moved in relation to the lever elements 30 and 31, which are secured on the supporting struts 14, 15 and are mounted in pivot spindles 25, 26 in the Y direction in the manner of a parallel displacement. It can furthermore be seen in FIG. 6 that the armrest support 17 is connected to the telescopic rods 18 and 19 via rod receptacles 32 and 33. The armrest support 17 is furthermore mounted in a displacement spindle 16 (see FIGS. 7 and 8) which is fastened to the backrest part 10A.

It is therefore ensured that, during the changing width of the outer seat 10, the backrest 10A can also be displaced in the Y direction.

Figure 7:
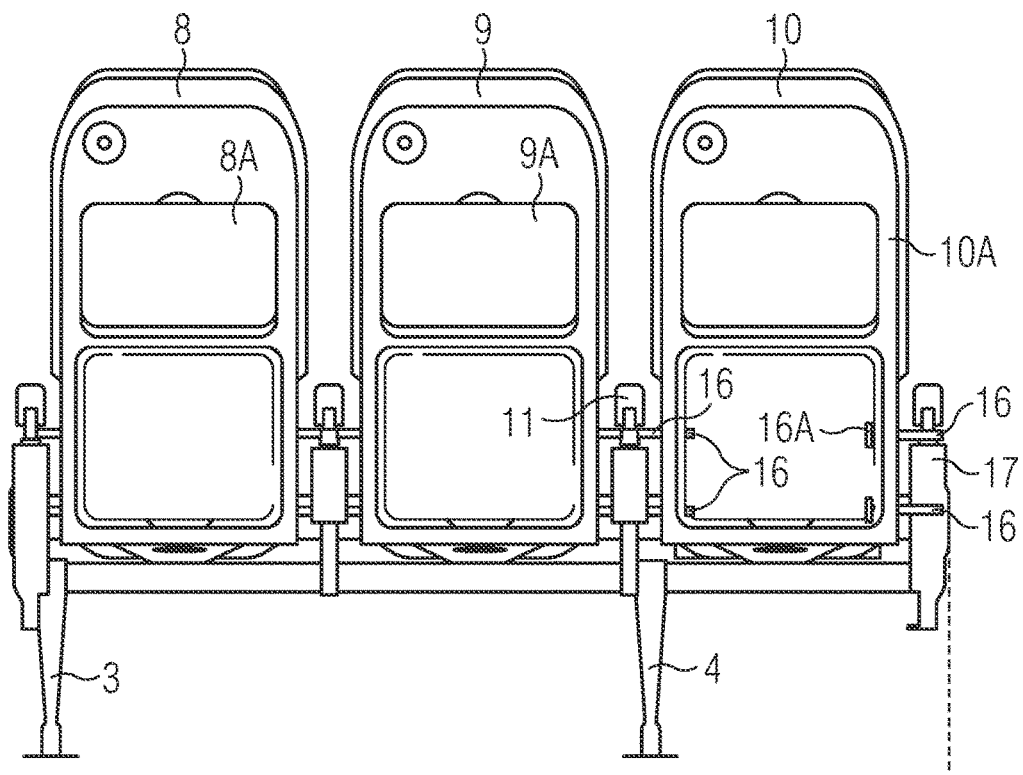
FIGS. 7 and 8 show the passenger seat group with the aisle seat in the normal position and in the lifted-up position, in the view from the rear.
Figure 8:
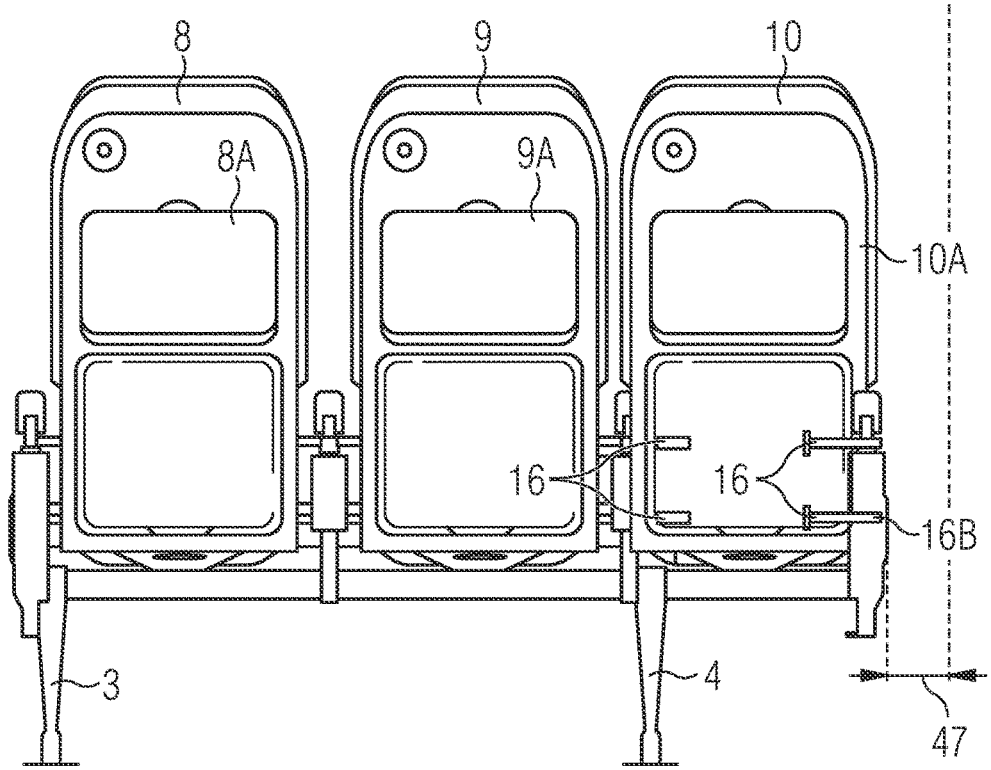

FIGS. 7 and 8 show the passenger seat group 1 with the aisle seat 10 in the normal position and in the lifted-up position in the view from the rear. In FIG. 7, the armrest support 17 is displaced outwards on the displacement spindle 16. The armrest support 17 is therefore positioned on the displacement spindle 16 at the outermost aisle end. A stop 16A defines this position. In this state, the seat 10 is in the normal position. The passenger seat group 1 has further displacement spindles 16 on which the backrest 10A can be displaced in a manner corresponding to the change in width of the seat 10. FIG. 8 shows the armrest support 17 which is positioned on the displacement spindle 16 at an outer stop 16B. The backrest 10A of the seat 10 is in the pushed-in state on the displacement spindle 16. The clearance which has been produced in the Y direction is illustrated by the arrow 47.

Figure 9:
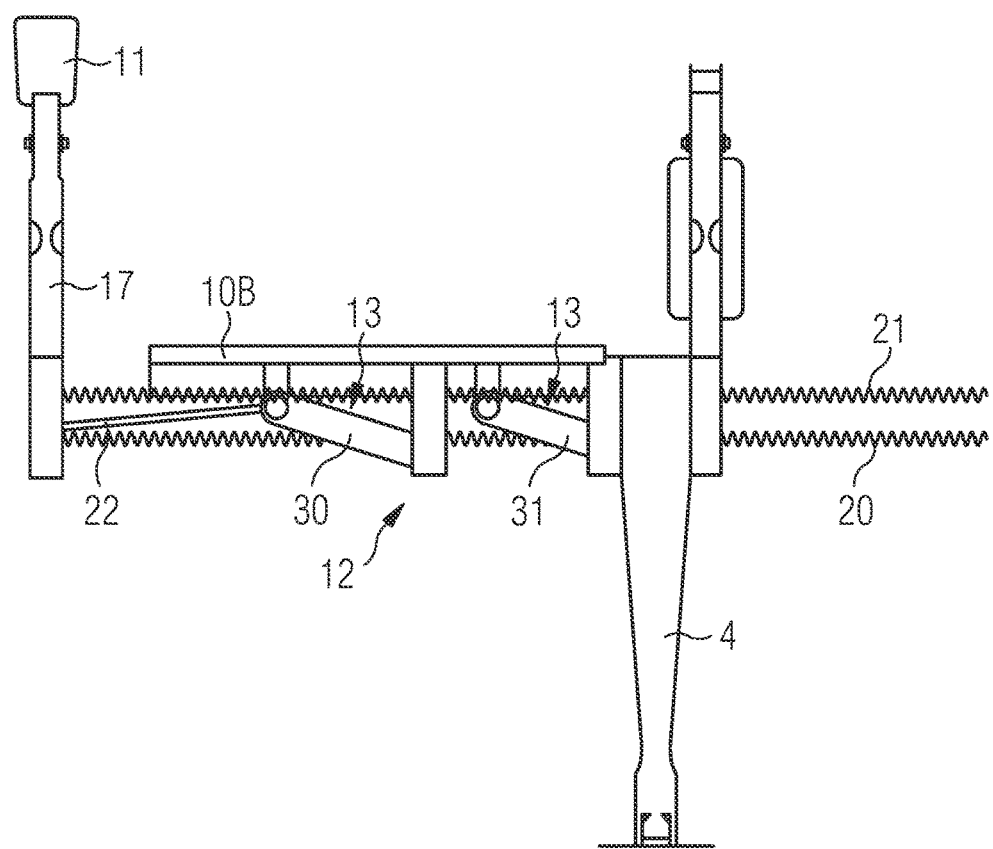
FIGS. 9 and 10 show the folding device of the seat in the normal position and in the lifted-up position, in a view from the front.
Figure 10:
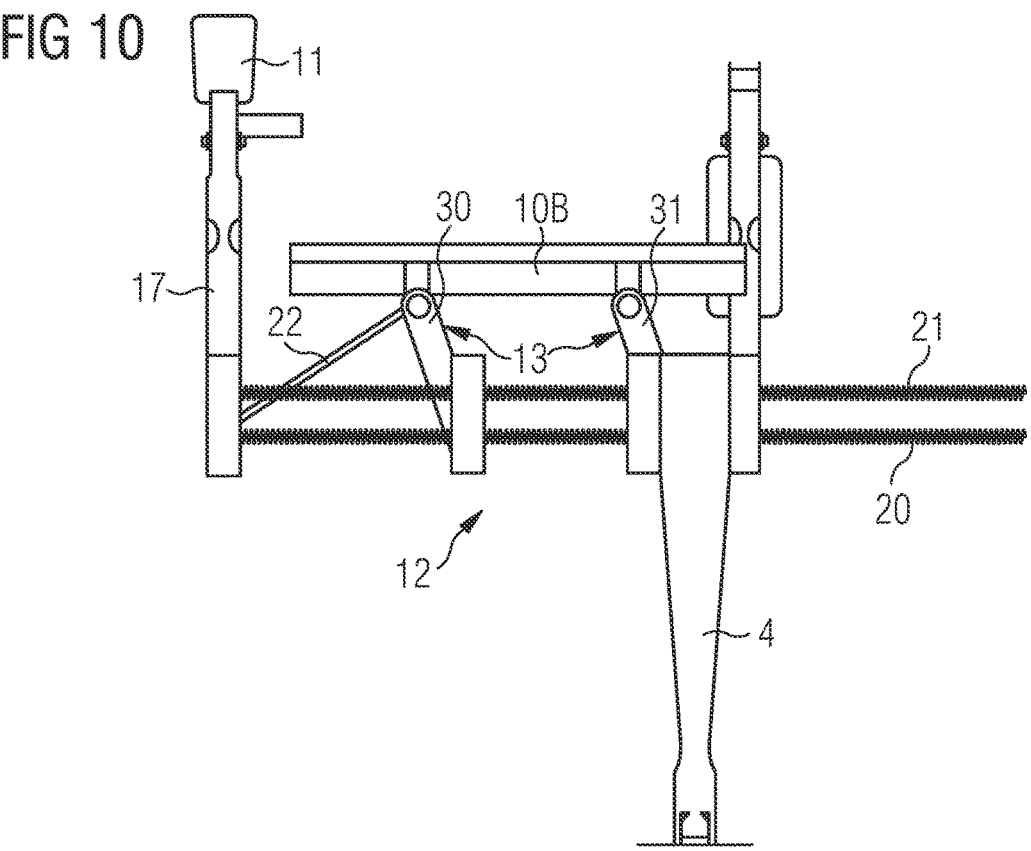

FIGS. 9 and 10 show the folding device 12 of the seat 10 in a normal position and a lifted-up position, in a schematic view from the front. The lever system 13 which positions the seat part 10B in the normal position (FIG. 9) or in the lifted-up position (FIG. 10) by the sliding element 22 in the manner of a displaceable parallelogram can be seen. The tensioned spiral springs 20 and 21—caused by loading by a weight force or, for example, by pushing down by manual force and locking in this position—are achieved in the normal position. During the boarding of or entry into the aircraft, the spring elements 20 and 21 are in the original relaxation position, as FIG. 10 shows. The lever system 13 with the lever elements 30 and 31 is positioned in its lifted-up state via the sliding element 22. The sliding element 22 is operatively connected to the outer lever element 30 in the manner of a toggle lever mechanism.

It should additionally be noted that "having" does not rule out other elements or steps, and the words "a" or "an" do not rule out a multiplicity. It should also be noted that features that have been described with reference to one of the above exemplary embodiments can also be used in combination with other features of other exemplary embodiments described above. Reference signs in the claims should not be regarded as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A seat group arrangement for a passenger cabin of an aircraft, the seat group arrangement having one or more passenger seat groups, each of the one or more passenger seat groups comprising:
   a supporting frame comprising seat legs for fastening the supporting frame to a floor of the aircraft;
   one or more fixed seats, each of which comprises a seat part and a backrest, wherein each of the one or more fixed seats is fixedly secured on the supporting frame;
   a further seat, which is movable in a transverse direction relative to the supporting frame and has a seat part and a backrest; and
   a folding device, by which the seat part of the further seat is connected to the supporting frame, wherein the folding device is configured to move the seat part of the further seat to and between a first position, in which the seat part of the further seat is in a first plane, and a second position, in which the seat part of the further seat is in a second plane, to change a width of a corresponding one of the one or more passenger seat groups on which the folding device is installed, the change in the width being in relation to the seat legs of the supporting frame;
   wherein the first plane is above the second plane.

2. The seat group arrangement according to claim 1, wherein the seat part of the one or more fixed seats is in the second plane, such that the seat part of the further seat is substantially coplanar with the seat part of the one or more fixed seats when the seat part of the further seat is in the second position.

3. The seat group arrangement according to claim 1, wherein the supporting frame comprises an upper part, which has one or more supporting struts and, in a region of the further seat, one or more telescopic rods, each of the one or more telescopic rods being movable relative to a corresponding one of the one or more supporting struts to change a width of the supporting frame in a manner corresponding to the change in the width of the corresponding one of the one or more passenger seat groups on which the folding device is installed.

4. The seat group arrangement according to claim 3, wherein:
   the folding device has one or more spring elements, each of which is associated with a corresponding one of the one or more telescopic rods;
   when the one or more spring elements are in an unloaded state, the one or more spring elements are configured to retract the one or more telescopic rods within the corresponding one of the one or more supporting struts, such that the seat part of the further seat is in the first position and the corresponding one of the one or more passenger seat groups on which the folding device is installed has a first width;
   when the one or more spring elements are in a loaded state, the one or more spring elements are configured to allow an extension of the one or more telescopic rods relative to the corresponding one of the one or more struts as the seat part of the further seat moves to the second position and the corresponding one of the one or more passenger seat groups on which the folding device is installed has a second width; and
   the second width is greater than the first width.

5. The seat group arrangement according to claim 4, wherein:
   the folding device has a lever system and a sliding element; and
   as the one or more telescopic rods are retracted within the corresponding one of the one or more supporting struts when the seat part of the further seat moves toward the first position, the lever system and the sliding element are configured to simultaneously move the seat part of the further seat vertically towards the first plane and move the seat part of the further seat laterally towards the one or more fixed seats to decrease the width of the corresponding one of the one or more passenger seat groups on which the folding device is installed.

6. The seat group arrangement according to claim 5, wherein, as the one or more telescopic rods extend from the corresponding one of the one or more supporting struts when the seat part of the further seat moves toward the second position, the lever system and the sliding element are configured to simultaneously move the seat part of the further seat vertically towards the second plane and move the seat part of the further seat laterally away from the one or more fixed seats to increase the width of the corresponding one of the one or more passenger seat groups on which the folding device is installed.

7. The seat group arrangement according to claim 3, comprising:
an outer armrest support attached at a first end of the supporting frame, adjacent a longitudinal aisle of the aircraft; and
an armrest element connected to the outer armrest support;
wherein the outer armrest support is connected to the one or more telescopic rods via at least one rod receptacle associated with the outer armrest support.

8. The seat group arrangement according to claim 1, comprising, for each of the one or more passenger seats, displacement spindles configured for displacement of the backrest of the further seat for changing the width of a corresponding one of the one or more passenger seat groups with which the displacement spindles as associated.

9. A passenger seat group comprising:
a supporting frame comprising seat legs for fastening the supporting frame to a floor;
one or more fixed seats, each of which comprises a seat part and a backrest, wherein each of the one or more fixed seats is fixedly secured on the supporting frame;
a further seat, which is movable in a transverse direction relative to the supporting frame and has a seat part and a backrest; and
a folding device, by which the seat part of the further seat is connected to the supporting frame, wherein the folding device is configured to move the seat part of the further seat to and between a first position, in which the seat part of the further seat is in a first plane, and a second position, in which the seat part of the further seat is in a second plane, to change a width of the passenger seat group, the change in the width being in relation to seat legs of the supporting frame;
wherein the first plane is above the second plane.

10. A passenger cabin for an aircraft, the passenger cabin comprising:
at least one longitudinal aisle;
at least one first region, in which seat rows with fixedly secured passenger seat groups are arranged; and
at least one second region, in which a seat group arrangement is arranged, the seat group arrangement having one or more passenger seat groups, each of the one or more passenger seat groups comprising:
a supporting frame comprising seat legs for fastening the supporting frame to a floor of the aircraft;
one or more fixedly seats, each of which comprises a seat part and a backrest, wherein each of the one or more fixed seats is fixedly secured on the supporting frame;
a further seat which is movable in a transverse direction relative to the supporting frame and has a seat part and a backrest; and
a folding device, by which the seat part of the further seat is connected to the supporting frame, wherein the folding device is configured to move the seat part of the further seat to and between a first position, in which the seat part of the further seat is in a first plane, and a second position, in which the seat part of the further seat is in a second plane, to change a width of a corresponding one of the one or more passenger seat groups on which the folding device is installed, the change in the width being in relation to the seat legs of the supporting frame;
wherein the first plane is above the second plane.

11. The passenger cabin according to claim 10, wherein the supporting frame comprises an upper part, which has one or more supporting struts and, in a region of the further seat, one or more telescopic rods, each of the one or more telescopic rods being movable relative to a corresponding one of the one or more supporting struts to change a width of the supporting frame in a manner corresponding to the change in the width of the corresponding one of the one or more passenger seat groups on which the folding device is installed.

12. The passenger cabin according to claim 11, wherein:
the folding device has one or more spring elements, each of which is associated with a corresponding one of the one or more telescopic rods;
when the one or more spring elements are in an unloaded state, the one or more spring elements are configured to retract the one or more telescopic rods within the corresponding one of the one or more supporting struts, such that the seat part of the further seat is in the first position and the corresponding one of the one or more passenger seat groups on which the folding device is installed has a first width;
when the one or more spring elements are in a loaded state, the one or more spring elements are configured to allow an extension of the one or more telescopic rods relative to the corresponding one of the one or more struts as the seat part of the further seat moves to the second position and the corresponding one of the one or more passenger seat groups on which the folding device is installed has a second width; and
the second width is greater than the first width.

13. The passenger cabin according to claim 12, wherein:
the folding device has a lever system and a sliding element; and
as the one or more telescopic rods are retracted within the corresponding one of the one or more supporting struts when the seat part of the further seat moves toward the first position, the lever system and the sliding element are configured to simultaneously move the seat part of the further seat vertically towards the first plane and move the seat part of the further seat laterally towards the one or more fixed seats to decrease the width of the corresponding one of the one or more passenger seat groups on which the folding device is installed.

14. The passenger cabin according to claim 13, wherein, as the one or more telescopic rods extend from the corresponding one of the one or more supporting struts when the seat part of the further seat moves toward the second position, the lever system and the sliding element are configured to simultaneously move the seat part of the further seat vertically towards the second plane and move the seat part of the further seat laterally away from the one or more fixed seats to increase the width of the corresponding one of the one or more passenger seat groups on which the folding device is installed.

15. The passenger cabin according to claim 11, comprising:
- an outer armrest support attached at a first end of the supporting frame, adjacent a longitudinal aisle of the aircraft; and
- an armrest element connected to the outer armrest support;
- wherein the outer armrest support is connected to the one or more telescopic rods via at least one rod receptacle associated with the outer armrest support.

16. The passenger seat group according to claim 9, wherein the supporting frame comprises an upper part, which has one or more supporting struts and, in a region of the further seat, one or more telescopic rods, each of the one or more telescopic rods being movable relative to a corresponding one of the one or more supporting struts to change a width of the supporting frame in a manner corresponding to the change in the width of the passenger seat group.

17. The passenger seat group according to claim 16, wherein:
- the folding device has one or more spring elements, each of which is associated with a corresponding one of the one or more telescopic rods;
- when the one or more spring elements are in an unloaded state, the one or more spring elements are configured to retract the one or more telescopic rods within the corresponding one of the one or more supporting struts, such that the seat part of the further seat is in the first position and the passenger seat group has a first width;
- when the one or more spring elements are in a loaded state, the one or more spring elements are configured to allow an extension of the one or more telescopic rods relative to the corresponding one of the one or more struts as the seat part of the further seat moves to the second position and the passenger seat group has a second width; and the second width is greater than the first width.

18. The passenger seat group according to claim 17, wherein:
- the folding device has a lever system and a sliding element; and
- as the one or more telescopic rods are retracted within the corresponding one of the one or more supporting struts when the seat part of the further seat moves toward the first position, the lever system and the sliding element are configured to simultaneously move the seat part of the further seat vertically towards the first plane and move the seat part of the further seat laterally towards the one or more fixed seats to decrease the width of passenger seat group.

19. The passenger seat group according to claim 18, wherein, as the one or more telescopic rods extend from the corresponding one of the one or more supporting struts when the seat part of the further seat moves toward the second position, the lever system and the sliding element are configured to simultaneously move the seat part of the further seat vertically towards the second plane and move the seat part of the further seat laterally away from the one or more fixed seats to increase the width of the passenger seat group.

20. The passenger seat group according to claim 16, comprising:
- an outer armrest support attached at a first end of the supporting frame, adjacent a longitudinal aisle of the aircraft; and
- an armrest element connected to the outer armrest support;
- wherein the outer armrest support is connected to the one or more telescopic rods via at least one rod receptacle associated with the outer armrest support.

* * * * *